A. T. MARTIN.
SEED CORN RACK.
APPLICATION FILED DEC. 20, 1911.
1,071,670.
Patented Aug. 26, 1913.
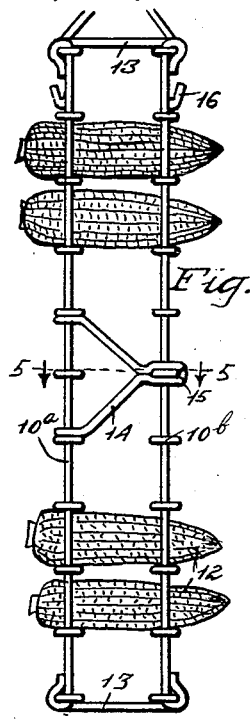
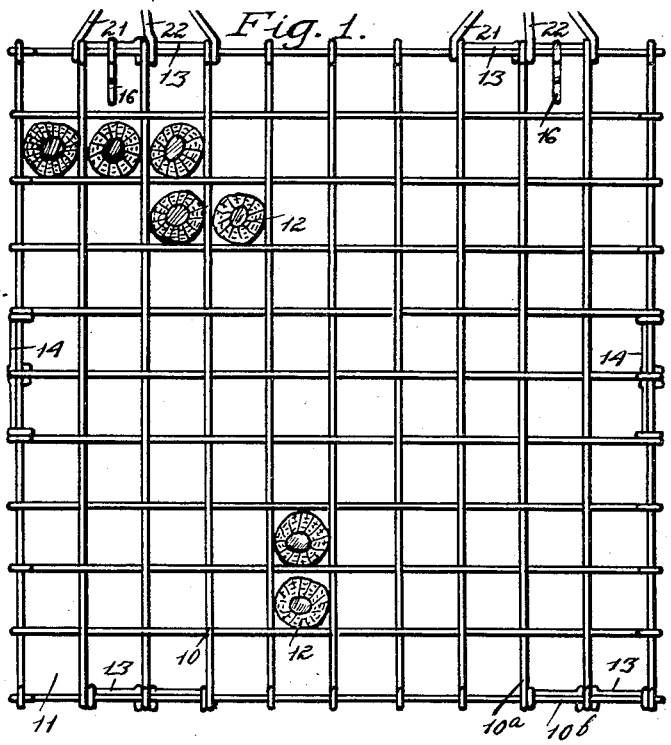
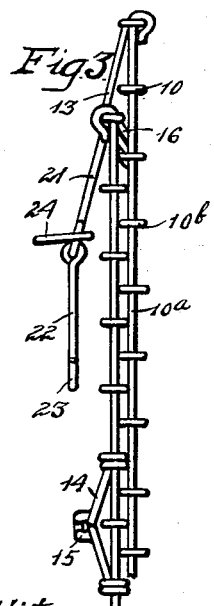
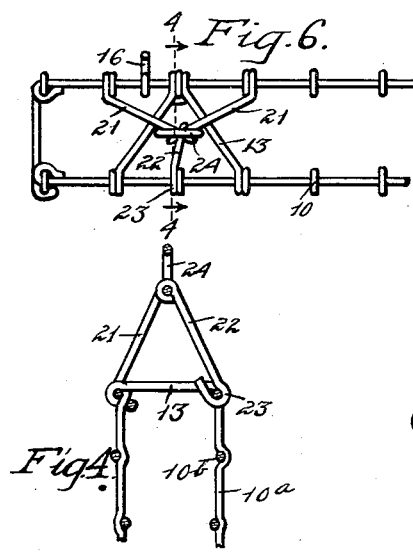
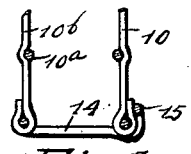
Witnesses
W. A. Loftus.
A. G. Hague
Inventor
Arthur T. Martin
by Orwig & Bair Attys

UNITED STATES PATENT OFFICE.

ARTHUR T. MARTIN, OF SAC CITY, IOWA.

SEED-CORN RACK.

1,071,670.  Specification of Letters Patent.  Patented Aug. 26, 1913.

Application filed December 20, 1911. Serial No. 667,005.

*To all whom it may concern:*

Be it known that I, ARTHUR T. MARTIN, a citizen of the United States, residing at Sac City, in the county of Sac and State of Iowa, have invented a new and useful Seed-Corn Rack, of which the following is a specification.

My invention relates to racks for holding ears of seed corn.

It is my object to produce a rack of simple, durable, and inexpensive construction, which is of extremely light weight, in which ears of seed corn may be held spaced apart from each other, and which touches only a small part of the surface of each ear of corn.

A further object is to provide a seed corn rack which may be collapsed into a comparatively small space for purposes of storage or transportation.

My rack is comprised of two sections of woven wire or other perforated material, pivoted together in such a way that when the rack is in position for use, the two sections are spaced apart from each other with the perforations in one section registering with the perforations in the other.

It is a further object of my invention to provide a collapsible seed corn rack having means whereby said rack may be readily secured in its extended position.

A further object is to provide a seed corn rack provided with means whereby said rack may be hung upon a hook or the like, which means are also adapted for securing together the two sections of the rack when in its closed or collapsed position.

My invention consists in certain details, in the construction, arrangement and combination of the various parts of the device, whereby the objects contemplated are attained, as hereinafter more fully set forth, pointed out in my claims, and illustrated in the accompanying drawings, in which—

Figure 1 shows a side elevation of my improved seed corn rack, in its open or extended position with a few ears of corn placed in position therein. Fig. 2 shows an end elevation of same. Fig. 3 shows an end elevation of my improved rack in its closed or collapsed position. Fig. 4 shows a detail, sectional view on the line 4—4 of Fig. 6. Fig. 5 shows a detail sectional view on the line 5—5 of Fig. 2. Fig. 6 shows a top view of a portion of my rack showing the means by which the two sections are secured together.

My improved seed corn rack is comprised of two sections which are indicated generally by the reference numeral 10 in the accompanying drawing, made of woven wire or other perforated material. I preferably use wire for the reason that the material is cheap and enables me to secure a maximum of space in the interstices, while a minimum of space is occupied by the material. In the drawing, I have shown the sections 10 composed of upright members $10^a$ spaced and parallel to each other and horizontal members $10^b$ spaced apart from and parallel to each other, interwoven to leave openings 11. I employ two sections 10 spaced apart from each other when the rack is in its extended position as shown in Fig. 2, at a sufficient distance from each other to conveniently hold ears of corn 12, as shown in Figs. 1 and 2. The ears of corn 12 are supported by the horizontal members $10^b$ and their lateral movement is prevented by the upright members $10^a$.

When the rack is in its extended position the opening 11 in each section, registers with the adjacent openings 11 in the other section. The sections 10 are pivotally secured to each other by means of arms 13, which may be of any suitable shape, but are shown in the drawings as V-shaped, with the free ends of the V pivoted to the end of one of the sections 10 and with the crotch end of the V pivoted to the other section 10. Similar arms 13 are provided for connecting the opposite ends of the sections 10. It will be seen that the sections 10 may be moved from their open position as shown in Fig. 2, to their closed or collapsed position as shown in Fig. 3. By moving the crotch end of the V-shaped arm 13, on the arc of a circle centered at a point midway between the points where the ends of the V-shaped arm 13 are secured to the section 10.

I preferably attach the V-shaped arm 13 to the sections 10 by placing the said V shaped arm in such position that one of the upright members $10^a$ is received in the crotch of said V shaped arm and the free ends of the said arm extend away from the rack at right angles thereto. The free ends of the V shaped arm are then moved upwardly and toward the other section 10, around one of the horizontal members 10ᵇ, thus bending the V shaped arm 13 at the crotch as shown in Fig. 4. The free ends of the V shaped arm 13 are then formed into loops around the horizontal member 10ᵇ at the end of the other section 10, thereby pivotally connecting said ends to said horizontal member. I preferably provide two arms 13 at each end of my rack.

For securing the rack in its extended position, I pivotally secure to the horizontal member 10ᵃ, at one side of one of the sections 10, the free ends of the V shaped device 14, as shown in Fig. 2. At the crotch end of said V shaped catch device 14 I press the two sides of said catch device together for a short distance and then bend the folded end of said catch device into a hook 15 as shown in Figs. 2 and 5. A catch device 14 is comprised of somewhat resilient metal, and the hook 15 and the sides of said V shaped catch device are spaced apart from each other at the point where they form the hook 15 at such a distance that said hook may be made to engage the horizontal member 10ᵇ at the side of the horizontal members 10ᵇ between the resilient sides of said hook as shown in Figs. 2 and 5. It will thus be seen that the hook 15 may be detachably secured to one of the sections 10 and the resiliency of the material of which it is composed will cause it to grip said section 10, thus together with the arms 13 holding the rack in its extended position. I provide catch devices 14 on each side of my rack.

For hanging the rack on hook, nail or the like, I provide at one end of said rack, hooks 16 pivoted to the horizontal member 10ᵇ of one of the sections 10. The shank of each of the hooks 16 is of proper length so that when the rack is in its collapsed position, as shown in Fig. 3, the hook may be used to engage one of the horizontal members 10ᵇ of the adjacent section 10, thus securing the rack in its collapsed position. I use as many of the hooks 16 as is necessary. I also provide means for hanging up my improved seed corn rack, comprising the device 20 which is composed of arms 21 which are pivoted to the upper end of one of the sections 10 and converge to a common point, where they are pivoted to an arm 22 on the free end of which, is formed a hook 23 designed to engage the other section 10. At the point where the arms 21 are pivoted to the arm 23, I secure an arm 24 on the end of which, is a hook or ring. I preferably secure two of the fastening devices 20 to the upper end of my improved seed corn rack.

In the practical use of my improved seed corn rack, it is placed in position with the sections 10 spaced apart from each other in parallel planes and with the perforations or openings 11, in one section registering with the openings 11 in the other section, as shown in Fig. 1. The fastening devices 14 are moved to position for engaging the adjacent section 10 as shown in Fig. 2, and they hold the rack rigidly in its extended position. When in this position, ears of corn 12 may be placed in the corresponding openings 11 in the section 10, and the rack hung up by hooks 16 or by fastening devices 20 and placed in storage. When my seed corn rack is not in use, and the ears of corn are removed therefrom, it may be collapsed by disengaging the hooks 16 and moving one of the sections 10 as hereinbefore described, until it is adjacent to the other section 10 as shown in Fig. 3.

My improved seed corn rack has the advantage of using a minimum amount of material, which occupies a minimum amount of space and allows a maximum amount of space for the ears of corn placed in the rack. The rack may be made of cheap, and durable material, is easy to construct, and simple in its operation. When not in use, it may be collapsed into comparatively small space for purposes of transportation or storage. The hooks 16 serve the double function of means for hanging up the rack, and for securing the sections 10 in position adjacent to each other when the rack is collapsed.

I claim as my invention:

1. In a seed corn rack of the class described, side walls of meshed wire, said walls being arranged so that the openings in one register with the openings in the other, fastening devices, each of which is made of resilient wire in the form of a V with its free end pivoted to the end wire of one wall, the crotch end of said device being bent to form a hook with the space between the engaging sides normally narrower than the diameter of the wires forming said walls.

2. In a seed corn rack of the class described, side walls of meshed wire, said walls being arranged so that the openings in one register with the openings in the other, fastening devices, each of which is pivoted to one wall and designed to be detachably secured to the other, and supporting devices comprising V shaped devices pivoted at their ends to one wall and at their crotched end to a hook, a hook pivoted at one end to said crotched end and designed to be detachably secured to the other end.

3. In a seed corn rack of the class described, side walls of meshed wire, said walls being arranged so that the openings in one register with the openings in the other, connecting devices at one end of said walls pivoted to each of said walls for securing them together and holding them spaced apart when the device is set up, fastening devices, each of which is made of resilient wire in the form of a V with its free end pivoted to the end wire of one wall, the crotch end of said device being bent to form a hook with the space between the engaging sides normally narrower than the diameter of the wires forming said walls.

Des Moines, Iowa, November 29, 1911.

ARTHUR T. MARTIN.

Witnesses:
EDWARD WELCH, Jr.,
F. P. KESSLER.